Patented Dec. 9, 1947

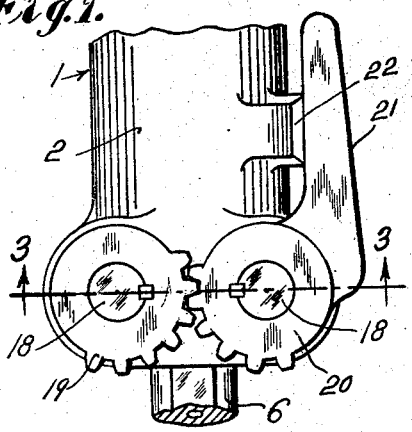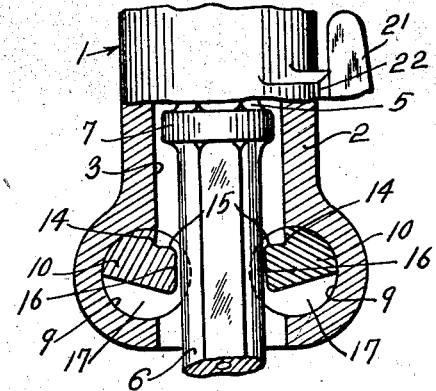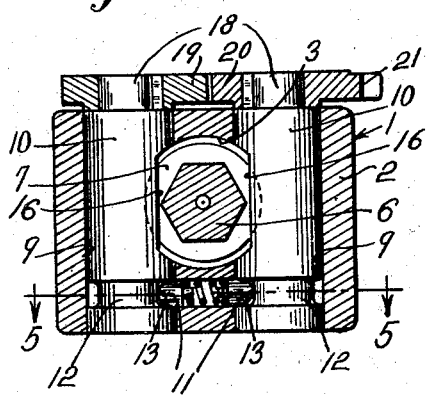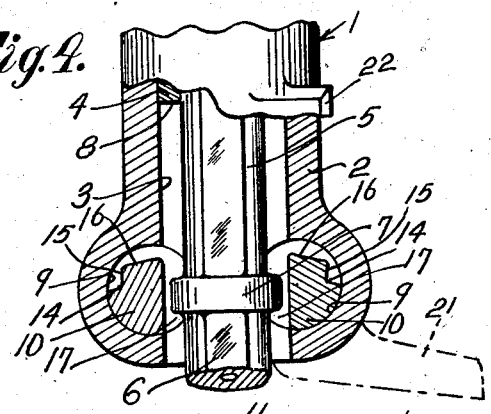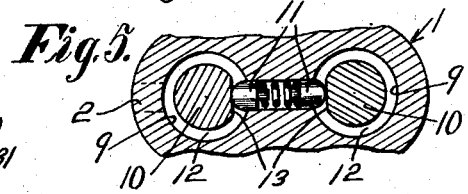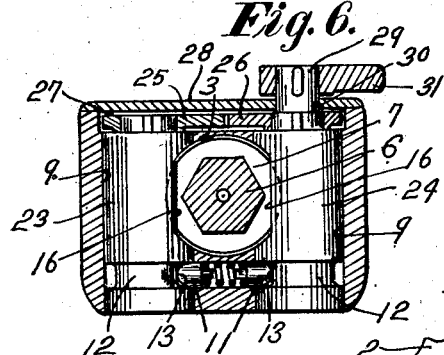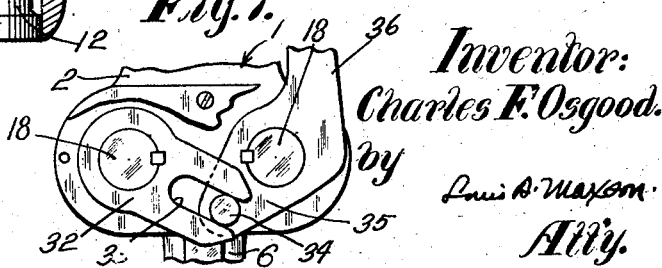
Inventor:
Charles F. Osgood.

2,432,331

UNITED STATES PATENT OFFICE 2,432,331

WORKING IMPLEMENT RETAINER

Charles F. Osgood, Claremont, N. H., assignor to Joy Manufacturing Company, a corporation of Pennsylvania Application April 2, 1945, Serial No. 586,052

3 Claims. (Cl. 279—19.4)

This invention relates to implement retainers, and more particularly to an improved retainer for the collared shank of the reciprocable working implement of a percussive tool.

An object of the present invention is to provide an improved implement retainer. Another object is to provide an improved retainer for the collared shank of a reciprocable working implement. A further object is to provide an improved retainer for the working implement of a percussive tool for preventing ejection of the shank from the tool housing during operation of the tool, and which is readily releasable to permit free removal of the implement shank from the tool housing. Yet another object is to provide an improved tool retainer embodying a pair of coacting rotary retainer members having a common operating element for concurrently rotating the retainer members in relatively opposite directions into and out of retaining position. Still another object is to provide an improved retainer embodying a pair of coacting cylindrical retainer members rotatably mounted in parallel transverse bores in the tool housing and rotatable into a position to obstruct the forward passage of the shank of the working implement from the tool housing and having recesses movable upon rotation of the retainer members into positions to permit free removal of the implement shank from the housing. A still further object is to provide an improved retainer of relatively rugged design for effectually retaining the shank of a working implement within the tool housing, and which may be easily and quickly operated. Other objects and advantages of the invention will, however, hereinafter more fully appear.

In the accompanying drawing there are shown for purposes of illustration one form and two modifications thereof which the invention may assume in practice.

In this drawing:

Fig. 1 is a side elevational view of the forward end of a percussive tool in which an illustrative form of the invention is embodied.

Fig. 2 is a view in central longitudinal section, partially in side elevation, through the tool shown in Fig. 1, illustrating details of the improved retainer with the coacting retainer members in operative retaining position.

Fig. 3 is a cross-sectional view taken on line 3—3 of Fig. 1.

Fig. 4 is a sectional view similar to Fig. 2, showing the retainer members in released non-retaining position.

Fig. 5 is a detail sectional view taken on line 5—5 of Fig. 3.

Fig. 6 is a cross-sectional view similar to Fig. 3, showing a modification.

Fig. 7 is a fragmentary side elevational view showing another modification.

In the illustrative form of the invention shown in Figs. 1 to 5 inclusive the improved retainer is shown embodied in a percussive tool generally designated 1, including a front housing 2 having a longitudinal bore 3 which contains a chuck 4 for receiving the shank 5 of a reciprocable working implement 6. The implement shank 5 has a usual integral circular collar 7 of slightly less diameter than the bore 3 and is free to reciprocate in the bore 3 as the working implement is percussively actuated. The front surface 8 of the chuck 4 provides an abutment with which the rear surface of the collar 7 is engageable to limit the rearward movement of the shank 5 in the chuck. A pair of parallel transverse bores 9, 9 are formed in the forward portion of the tool housing at the opposite sides of the bore 3, and these transverse bores open, between their ends and at their inner sides, into the bore 3 in the manner shown. Received in these parallel bores are coacting rotary retainer members 10, of cylindrical shape except as later described; and spring pressed plungers 11 are engaged in annular grooves 12 in the retainer members for holding the latter in position in the bores. The bottoms of the grooves 12 are flattened at 13, and the plungers cooperate with these flat surfaces in holding the retainer members in retaining position (Fig. 5). The retainer members are recessed at 14 to provide abutment surfaces 15 with which the forward surface of the implement collar 7 is engageable when the retainer members are in retaining position, as shown in Fig. 2; and the retainer members are preferably made of such size and so disposed that the adjacent sides of the retainer members need to be cut away at 16 to clear the sides of the working implement when the members are in retaining position. Oppositely from the recesses 14 the retainer members are formed with arcuate recesses 17 of a radius equal to the radius of the bore 3 so that the bottom surfaces of the recesses conform to the walls of the bore 3 when the retainer members are in their released, non-retaining position, as shown in Fig. 4. Desirably, the recesses 14 and 17 and the cut-away portions 16 are formed entirely within the cylindrical peripheries of the retainer members so that the retainer members may be withdrawn axially from their bores in an obvious manner when sufficient axial pressure is applied to them to force the plungers 11 out of the grooves 12 by the cam or wedging action of the walls of the grooves on the plungers. When the retainer members are released, the collar 7 may be moved freely through the recesses 17 to permit withdrawal of the shank of the working implement from the housing bore. The retainer members 10 may be actuated in various manners; and, in this instance, keyed to the projecting ends 18 of the retainer members are gear segments 19 and 20 having intermeshing teeth, and the segment 20 has an integral operating lever 21 disposed exteriorly of the tool housing whereby the gear segments may be conveniently actuated to rotate the retainer members concurrently in relatively opposite directions into their different operating positions. When the retainer members are in retaining position, as shown in Fig. 2, the lever 21 engages a stop 22 on the side of the tool housing, and at that time the spring pressed plungers 11 rest against the flat surfaces 13 to hold the parts in position.

In the modification shown in Fig. 6 the retainer members 23, 24 are somewhat shorter in length than those above described, and the gear segments 25 and 26 are enclosed within a chamber 27 provided with a detachable cover plate 28. The reduced end 29 of the retainer member 24 extends out through an opening 30 in the cover plate and has an operating lever 31 keyed thereto. The lever 31 is arranged exteriorly of the tool housing in the manner of the lever 21, and likewise engages a stop 22. By enclosing the gear segments within a chamber in the tool housing, the possibility of access of dirt to the teeth of the gear segments is reduced and the gear teeth are protected from possible damage. In the modification shown in Fig. 7 the intermeshing gear segments are omitted and in lieu thereof there is keyed to one of the retainer members a forked arm 32. Engaged in the arm slot 33 is a pinlike projection 34 secured to the arm 35 of an operating lever 36 keyed to the other retainer member and, like the levers 21 and 31, arranged exteriorly of the tool housing. When the lever 36 is swung, the slot and pin connection effects concurrent rotation of the retainer members in relatively opposite directions. Otherwise these modified constructions are similar to that of the other embodiment.

During operation of the percussive tool the working implement 6 is percussively actuated by the usual tool motor, and the collar 7 of the working implement as the latter is rapidly reciprocated may strike against the abutment surfaces 15 on the retainer members 10 when the latter are in retaining position, as shown in Fig. 2. Thus ejection of the implement shank 5 from the housing bore 3 is prevented by the coacting retainer members; and by arranging the retainer members at the opposite sides of the working implement in the manner shown relatively strong stop abutments are afforded. Thus the implement shank is effectively retained in the housing bore. When it is desired to remove the implement shank from the housing bore, the retainer members may be quickly turned into their released non-retaining position shown in Fig. 4, simply by swinging the operating lever 21 to the dotted line position shown in Fig. 4. The implement collar 7, when the retainer members are released, can be moved freely outwardly past the retainer members through the recesses 17 to enable withdrawal of the implement shank from the tool housing. The retainer members of the modifications shown in Figs. 6 and 7 may be rotated into their different operating positions in a manner similar to that above described.

As a result of this invention an improved implement retainer is provided having an improved arrangement of the coacting retainer members whereby the working implement is retained in the tool housing in an improved manner. By the provision of the interlocking connections between the coacting rotary retainer members, the latter may be concurrently rotated in relatively opposite directions into their different operating positions by the swinging of but a single lever. The cylindrical retainer members, arranged in parallel transverse bores in the tool housing, have adequate bearing surfaces, and due to the relatively tight fit of the retainer members in their bores the possibility of access of dirt to the bearing surfaces is substantially reduced and the bearing surfaces may be kept properly lubricated. The improved retainer structure is not only rugged, but is also relatively simple and inexpensive in design. Other uses and advantages of the invention will be clearly apparent to those skilled in the art.

While there are in this application specifically described one form and two modifications thereof which the invention may assume in practice, it will be understood that these are shown for purposes of illustration only and that the invention may be further modified and embodied in various other forms without departing from its spirit or the scope of the appended claims.

What I claim as new and desire to secure by Letters Patent is:

1. A retainer for the collared shank of the reciprocable working implement of a percussive tool, comprising, in combination, a tool housing having a longitudinal bore for receiving the collared shank of the working implement and in which the shank collar is reciprocable, said housing having parallel transverse bores in the opposite sides thereof opening into the opposite sides of said longitudinal bore, coacting rotary retainer members relative to which the working implement is freely reciprocable during operation of the tool and disposed in said parallel bores at opposite sides of the implement and rotatable into a position to provide an obstruction, in advance of the shank collar, to forward movement of the shank collar to prevent ejection of the implement shank from the longitudinal bore of the tool housing, said rotary members being laterally recessed and rotatable into a position wherein said recesses permit the free passage of the collar past said retainer members to permit the removal of the implement shank from said longitudinal bore, and manually operable means arranged exteriorly of the tool housing and operatively connected to both retainer members for concurrently rotating the same in relatively opposite directions in said parallel bores into their different operating positions.

2. A retainer for the collared shank of the reciprocable working implement of a percussive tool, comprising, in combination, a housing in which the collared shank of the implement is reciprocable, a pair of coacting cylindrical retainer members relative to which the working implement is freely reciprocable during operation of the tool and arranged in parallel relation on transverse axes at opposite sides of the housing and having recesses providing abutment surfaces movable upon rotation of said members into and out of a position at opposite sides of the implement wherein said abutment surfaces provide stops for the shank collar in advance of the latter to prevent forward ejection of the implement shank from the housing, said retainer members being annularly grooved in common transverse planes, and said housing containing spring pressed plungers engaging in said grooves for holding said members against endwise displacement, portions of the bottoms of said grooves being flat and the plungers engaging the flattened surfaces thus provided to hold said members in one of their operating positions, and means for operatively connecting said members for concurrent rotation in relatively opposite directions into their different operating positions.

3. In combination, in a retainer for a percussively actuated tool which is provided with a collar spaced from the percussively actuated end thereof, housing means providing a chamber for reciprocably receiving the collar of such a tool, relatively movable retainer members relative to which the tool is freely movable during actuation thereof and rotatably mounted in spaced apart relation within said housing means on parallel axes at opposite sides of the axis of said chamber and in predetermined positions of said members having portions extending into said chamber in such a manner as to provide abutment surfaces closer to each other than the transverse diameter of the tool collar in advance of the latter to limit outward movement of the tool during actuation thereof, said members also being formed laterally with portions of so much less radial dimension than their radial dimensions at said portions that in other predetermined positions of said members space is provided to permit the passage of the collar between said members, and said members having connections enclosed within said housing means for connecting them for concurrent rotation on their respective axes, and operating means therefor arranged exteriorly of said housing means to cause said members to occupy their mutually corresponding predetermined positions above mentioned together.

CHARLES F. OSGOOD.

REFERENCES CITED

The following references are of record in the file of this patent:

UNITED STATES PATENTS

| Number | Name | Date |
| --- | --- | --- |
| 2,135,157 | West | Nov. 1, 1938 |
| 1,933,639 | Shafer | Nov. 7, 1933 |
| 1,735,816 | Trogner et al. | Nov. 12, 1929 |
| 2,298,719 | O'Farrell | Oct. 13, 1942 |
| 2,400,206 | O'Farrell | May 14, 1946 |
| 2,026,703 | Peters | Jan. 7, 1936 |

FOREIGN PATENTS

| Number | Country | Date |
| --- | --- | --- |
| 4,231 | Australia | Dec. 24, 1931 |

Certificate of Correction

Patent No. 2,432,331.                                         December 9, 1947.

CHARLES F. OSGOOD

It is hereby certified that error appears in the printed specification of the above numbered patent requiring correction as follows: Column 5, line 11, for the word "flattened" read *flat*; and that the said Letters Patent should be read with this correction therein that the same may conform to the record of the case in the Patent Office.

Signed and sealed this 20th day of April, A. D. 1948.

[SEAL]

THOMAS F. MURPHY,
*Assistant Commissioner of Patents.*